(12) United States Patent
Mesters et al.

(10) Patent No.: US 8,722,006 B2
(45) Date of Patent: *May 13, 2014

(54) PROCESS FOR THE MANUFACTURE OF CARBON DISULPHIDE

(75) Inventors: Carolus Matthias Anna Maria Mesters, Amsterdam (NL); Ronald Jan Schoonebeek, Amsterdam (NL)

(73) Assignee: Shell Oil Company, Houston, TX (US)

( * ) Notice: Subject to any disclaimer, the term of this patent is extended or adjusted under 35 U.S.C. 154(b) by 100 days.

This patent is subject to a terminal disclaimer.

(21) Appl. No.: 12/300,748

(22) PCT Filed: May 14, 2007

(86) PCT No.: PCT/EP2007/054613
§ 371 (c)(1),
(2), (4) Date: Apr. 9, 2009

(87) PCT Pub. No.: WO2007/131977
PCT Pub. Date: Nov. 22, 2007

(65) Prior Publication Data
US 2009/0226358 A1 Sep. 10, 2009

(30) Foreign Application Priority Data
May 16, 2006 (EP) .................................... 06114009

(51) Int. Cl.
*C01B 31/26* (2006.01)

(52) U.S. Cl.
USPC .......................................... 423/443; 423/444

(58) Field of Classification Search
USPC ................................. 423/443, 444
See application file for complete search history.

(56) References Cited

U.S. PATENT DOCUMENTS

| | | | |
|---|---|---|---|
| 1,765,809 A | 6/1930 | Vogel | |
| 1,981,161 A | 11/1934 | Bodenstein | 23/206 |
| 2,330,934 A | 10/1943 | Thacker et al. | 23/206 |
| 2,492,719 A | 12/1949 | Thacker et al. | 23/206 |
| 2,636,810 A | 4/1953 | Marisic et al. | 23/206 |
| 2,663,622 A | 12/1953 | Odell et al. | 23/206 |
| 2,670,801 A | 3/1954 | Sherborne et al. | 166/21 |
| 3,087,788 A | 4/1963 | Porter et al. | 23/181 |
| 3,250,595 A * | 5/1966 | Olsen | 423/443 |
| 3,345,135 A | 10/1967 | Kerr et al. | 23/206 |
| 3,366,452 A | 1/1968 | Lauer | 23/204 |
| 3,393,733 A | 7/1968 | Kuo et al. | 166/8 |
| 3,402,768 A | 9/1968 | Felsenthal et al. | 166/2 |
| 3,498,378 A | 3/1970 | Stone et al. | 166/263 |
| 3,581,821 A | 6/1971 | Ross | 166/245 |
| 3,647,906 A | 3/1972 | Farley | 260/683 |
| 3,672,448 A | 6/1972 | Hoyt | 166/245 |
| 3,724,553 A | 4/1973 | Snavely, Jr. et al. | 166/304 |
| 3,729,053 A | 4/1973 | Froning | 166/304 |
| 3,754,598 A | 8/1973 | Holloway, Jr. | 166/249 |
| 3,794,114 A | 2/1974 | Brandon | 166/249 |
| 3,805,892 A | 4/1974 | Haynes, Jr. | 166/245 |
| 3,822,748 A | 7/1974 | Allen et al. | 166/269 |
| 3,823,777 A | 7/1974 | Allen et al. | 166/266 |
| 3,840,073 A | 10/1974 | Allen et al. | 166/274 |
| 3,847,220 A | 11/1974 | Allen et al. | 166/273 |
| 3,847,221 A | 11/1974 | Allen et al. | 166/274 |
| 3,850,245 A | 11/1974 | Allen et al. | 166/274 |
| 3,878,892 A | 4/1975 | Allen et al. | 166/267 |
| 3,927,185 A | 12/1975 | Meadow et al. | 423/443 |
| 3,932,595 A * | 1/1976 | Berthoux et al. | 423/443 |
| 4,008,764 A | 2/1977 | Allen | 166/266 |
| 4,057,613 A | 11/1977 | Meadow et al. | 423/443 |
| 4,122,156 A | 10/1978 | Kittrell et al. | 423/443 |
| 4,182,416 A | 1/1980 | Trantham et al. | 166/245 |
| 4,305,463 A | 12/1981 | Zakiewicz | 106/245 |
| 4,393,937 A | 7/1983 | Dilgren et al. | 166/272 |
| 4,476,113 A | 10/1984 | Young et al. | 424/161 |
| 4,488,976 A | 12/1984 | Dilgren et al. | 252/8.55 D |
| 4,543,434 A | 9/1985 | Chang | 585/310 |
| 4,550,779 A | 11/1985 | Zakiewicz | 166/248 |
| 4,822,938 A | 4/1989 | Audeh et al. | 585/324 |
| 4,963,340 A | 10/1990 | Audeh et al. | 423/444 |
| 5,065,821 A | 11/1991 | Huang et al. | 166/245 |
| 5,076,358 A | 12/1991 | Kissel | 166/275 |
| 5,120,935 A | 6/1992 | Nenniger | 392/305 |
| 5,607,016 A | 3/1997 | Butler | 166/263 |
| 5,609,845 A | 3/1997 | Cimini et al. | 423/648.1 |

(Continued)

FOREIGN PATENT DOCUMENTS

| | | | |
|---|---|---|---|
| CN | 1389397 | 1/2003 | ............ C01B 17/16 |
| CN | 1220626 | 9/2005 | ............ C01B 31/26 |
| CN | 1220626 C * | 9/2005 | |
| DE | 697186 C | 10/1940 | |
| DE | 1046592 | 1/1955 | |

(Continued)

OTHER PUBLICATIONS

SU 600087 A Derwent Abstract, Biba et al., Mar. 1978.*
International Search Report dated Jul. 25, 2007 (PCT/EP2007/054613).

Primary Examiner — Melissa Stalder

(57) ABSTRACT

The invention provides a process for the manufacture of carbon disulphide comprising supplying a molecular oxygen-containing gas and a feedstock comprising a hydrocarbonaceous compound to a reaction zone containing a liquid elemental sulphur phase and reacting, in the liquid sulphur phase, at a temperature in the range of from 300 to 750° C., the hydrocarbonaceous compound with elemental sulphur to form carbon disulphide and hydrogen sulphide and oxidizing at least part of the hydrogen sulphide formed to elemental sulphur and water. The invention further provides the use of a liquid stream comprising carbon disulphide, hydrogen sulphide and carbonyl sulphide obtainable such process for enhanced oil recovery.

15 Claims, No Drawings

(56) References Cited

U.S. PATENT DOCUMENTS

| | | | |
|---|---|---|---|
| 5,803,171 A | 9/1998 | McCaffery et al. | 166/245 |
| 5,826,656 A | 10/1998 | McGuire et al. | 166/305.1 |
| 6,136,282 A | 10/2000 | Fisher | 423/220 |
| 6,149,344 A | 11/2000 | Eaton | 405/128 |
| 6,241,019 B1 | 6/2001 | Davidson et al. | 166/249 |
| 6,405,797 B2 | 6/2002 | Davidson et al. | 166/249 |
| 6,497,855 B1 | 12/2002 | Wachs | 423/648.1 |
| 6,506,349 B1 | 1/2003 | Khanmamedov | 423/210 |
| 6,706,108 B2 | 3/2004 | Polston | 106/285 |
| 6,851,473 B2 | 2/2005 | Davidson | 166/263 |
| 2001/0008619 A1 | 7/2001 | Geus et al. | 423/230 |
| 2002/0134706 A1 | 9/2002 | Keller et al. | 208/250 |
| 2003/0047309 A1 | 3/2003 | Thomas et al. | 166/265 |
| 2003/0194366 A1 | 10/2003 | Srinivas et al. | 423/230 |
| 2004/0016676 A1* | 1/2004 | Newton | 208/113 |
| 2004/0022721 A1 | 2/2004 | Watson et al. | 423/574.1 |
| 2004/0096381 A1 | 5/2004 | Watson et al. | 423/224 |
| 2004/0146288 A1 | 7/2004 | Vinegar et al. | 392/301 |
| 2004/0146450 A1 | 7/2004 | Stauffer | 423/443 |
| 2004/0159583 A1 | 8/2004 | Mesters et al. | 208/208 |
| 2004/0256097 A1 | 12/2004 | Byrd et al. | 166/901.1 |
| 2005/0189108 A1 | 9/2005 | Davidson | 166/249 |
| 2006/0254769 A1 | 11/2006 | Wang et al. | 166/266 |
| 2007/0251686 A1 | 11/2007 | Sivrikoz et al. | 166/249 |
| 2008/0023198 A1 | 1/2008 | Hsu | 166/268 |
| 2008/0087425 A1 | 4/2008 | Hsu | 166/266 |

FOREIGN PATENT DOCUMENTS

| | | | |
|---|---|---|---|
| EP | 0581026 | 2/1994 | C01B 17/04 |
| GB | 1007674 | 10/1965 | |
| GB | 1129110 | 4/1966 | C01B 31/26 |
| GB | 1173344 | 12/1969 | C01B 31/26 |
| GB | 2379685 | 3/2003 | E21B 43/16 |
| SU | 600087 A * | 3/1978 | |
| WO | WO9850679 | 11/1998 | E21B 43/30 |
| WO | WO2007131976 | 11/2007 | C01B 31/26 |
| WO | WO2007131977 | 11/2007 | C01B 31/26 |
| WO | WO2008003732 | 1/2008 | C01B 31/26 |
| WO | WO2008034777 | 3/2008 | C01B 31/26 |

* cited by examiner

PROCESS FOR THE MANUFACTURE OF CARBON DISULPHIDE

PRIORITY CLAIM

The present application claims priority of European Patent Application No. 06114009.1 filed 16 May 2006.

FIELD OF THE INVENTION

The present invention provides a process for the manufacture of carbon disulphide and the use of a liquid stream comprising carbon disulphide, hydrogen sulphide and carbonyl sulphide obtainable by such process for enhanced oil recovery.

BACKGROUND OF THE INVENTION

Carbon disulphide is typically manufactured by reacting a lower hydrocarbon with elemental sulphur that is in the vapour phase according to the reaction equation:

$$C_nH_{2(n+1)} + (3n+1)S \rightarrow nCS_2 + (n+1)H_2S \qquad (1)$$

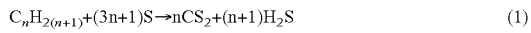

In GB 1,173,344 is disclosed a process for reacting vapour phase sulphur and propane in the absence of a catalyst under a pressure not exceeding 10 atmospheres in a reaction zone which is maintained at a temperature of 550 to 850° C.

In U.S. Pat. No. 3,087,788 is disclosed a process for producing carbon disulphide from hydrocarbon gas and vaporous sulphur in a non-catalytic reaction stage combined with, preferably followed by, a catalytic reaction stage, wherein both stages are operated at a pressure between 2 and 20 atmospheres and a temperature between 400 and 750° C.

It is also known to manufacture carbon disulphide by catalytically reacting liquid sulphur with a hydrocarbon. In U.S. Pat. No. 2,492,719 for example is disclosed a process for preparing carbon disulphide, wherein a suspension of catalyst in molten sulphur is contacted with a hydrocarbon gas at a temperature of approximately 500 to 700° C., under sufficient pressure to maintain the sulphur in liquid phase.

A disadvantage of the prior art processes described above is that hydrogen sulphide is produced in a molar quantity that is larger than the molar quantity of carbon disulphide formed.

In U.S. Pat. No. 3,345,135 is disclosed a catalytic process for producing carbon disulphide and oxides of carbon, wherein a gaseous saturated or unsaturated aliphatic hydrocarbon having 1 to 20 carbon atoms, an oxidising gas, especially oxygen, and hydrogen sulphide are reacted at temperatures of about 100 to 700° C. in the presence of a specific aluminosilicate catalyst. Considerable amounts of carbon dioxide and carbon monoxide are formed. It can be seen from the examples that the molar amount of carbon oxides formed by far exceeds the molar amount of carbon disulphide formed.

Carbon disulphide is known to be a suitable solvent for enhanced oil recovery by miscible flooding. In enhanced oil recovery by miscible flooding, a solvent for oil is introduced into an oil reservoir and driven through the reservoir to increase oil recovery from the reservoir beyond what can be achieved by conventional means. In U.S. Pat. No. 3,847,221 for example, the use of carbon disulphide for enhanced oil recovery from tar sands is disclosed.

SUMMARY OF THE INVENTION

It has now been found that carbon disulphide can be manufactured from a hydrocarbonaceous compound and liquid elemental sulphur under conditions at which the hydrogen sulphide formed is selectively oxidised to elemental sulphur by the addition of molecular oxygen to the reaction mixture, i.e. with minimum co-production of carbon dioxide and carbon monoxide.

Accordingly, the present invention provides a process for the manufacture of carbon disulphide comprising supplying a molecular oxygen-containing gas and a feedstock comprising a hydrocarbonaceous compound to a reaction zone containing a liquid elemental sulphur phase and reacting, in the liquid sulphur phase, at a temperature in the range of from 300 to 750° C., the hydrocarbonaceous compound with elemental sulphur to form carbon disulphide and hydrogen sulphide and oxidising at least part of the hydrogen sulphide formed to elemental sulphur and water.

An advantage of the process according to the invention is that only very small amounts of carbon oxides are formed. A further advantage is that the process according to the invention can be carried out in the absence of a catalyst.

Compared to the conventional vapour phase process for carbon disulphide production, the process according to the invention has several advantages. One advantage is that only a small amount of hydrogen sulphide is obtained with the carbon disulphide. As a consequence, only a small stream of hydrogen sulphide has to be recycled to a hydrogen sulphide concentration and conversion process unit, e.g. a Claus or a SCOT unit, if high purity carbon disulphide is the desired product. Another advantage is that there is no need to vaporise the sulphur. A further advantage is that the exothermic selective oxidation reaction generates heat that is used in the endothermic reaction between the hydrocarbonaceous compound and sulphur.

DETAILED DESCRIPTION OF THE INVENTIONS

In the process according to the invention, a gaseous phase comprising carbon disulphide and steam is obtained. The gaseous phase typically also comprises hydrogen sulphide and carbonyl sulphide. The gaseous phase may also comprise carbon oxides, sulphur oxides, unconverted hydrocarbonaceous compound and elemental sulphur. By subjecting the gaseous phase to a single or sequential condensation steps, a liquid stream comprising carbon disulphide is obtained from the process according to the invention. The liquid stream may also comprise other compounds such as water, unconverted hydrocarbons, carbon oxides, sulphur oxides, hydrogen sulphide, carbonyl sulphide and/or elemental sulphur. It will be appreciated that the exact composition will mainly depend on the temperature and pressure at which the condensation step(s) are carried out. The liquid stream obtained will typically comprise some hydrogen sulphide and carbonyl sulphide dissolved in the carbon disulphide. The liquid stream comprising carbon disulphide that is obtained in the process according to the invention may suitably be used for enhanced oil recovery.

Accordingly, the present invention further provides the use of a liquid stream comprising carbon disulphide, hydrogen sulphide and carbonyl sulphide for enhanced oil recovery, the liquid stream being obtainable by a process as hereinabove defined.

In the process according to the invention, carbon disulphide is produced by reacting a hydrocarbonaceous compound with elemental sulphur in a reaction zone containing a liquid elemental sulphur phase. The reaction between hydrocarbonaceous compound and elemental sulphur is carried out in the liquid sulphur phase. The reactants are reacted with each other at a temperature in the range of from 300 to 750° C. and at a pressure sufficient to maintain a liquid elemental sulphur phase.

Both a molecular oxygen containing gas and a feedstock comprising a hydrocarbonaceous compound are supplied to the reaction zone containing the liquid elemental sulphur phase. Reference herein to a hydrocarbonaceous compound is to a compound having carbon and hydrogen atoms and, optionally, a smaller amount of heteroatoms such as oxygen, sulphur or nitrogen. The hydrocarbonaceous compound may be gaseous, liquid, or solid at the reaction conditions applied. Examples of suitable hydrocarbonaceous compounds are hydrocarbons, asphalthenes, mercaptans, thiophenes, and alkylpolysulphides. Preferably, the hydrocarbonaceous compound is gaseous at the reaction conditions applied.

Preferably, the hydrocarbonaceous compound is a hydrocarbon, more preferably a saturated or unsaturated aliphatic hydrocarbon, more preferably an aliphatic hydrocarbon with in the range of from 1 to 20 carbon atoms. Saturated hydrocarbons with 1 to 4 carbon atoms, in particular methane, ethane, and propane, are particularly suitable reactants in the process according to the invention.

In the process according to the invention, the hydrocarbonaceous compound and elemental sulphur react with each other. In case the hydrocarbonaceous compound is a saturated aliphatic hydrocarbon, the reaction is according to the overall reaction equation (1):

$$C_nH_{2(n+1)} + (3n+1)S \rightarrow nCS_2 + (n+1)H_2S \qquad (1)$$

Molecular oxygen is supplied to the reaction zone in order to oxidise at least part of the hydrogen sulphide formed into elemental sulphur according to reaction equation (2):

$$(n+1)H_2S + \tfrac{1}{2}(n+1)O_2 \rightarrow (n+1)H_2O + (n+1)S \qquad (2)$$

The overall result of reaction equations (1) and (2) is then:

$$C_nH_{2(n+1)} + 2nS + \tfrac{1}{2}(n+1)O_2 \rightarrow nCS_2 + (n+1)H_2O \qquad (3)$$

The feedstock may comprise more than one hydrocarbonaceous compound. The feedstock may also comprise other compounds, for example hydrogen sulphide, carbon oxides, and inert gases such as nitrogen and helium. Examples of suitable feedstocks for the process according to the invention are natural gas, liquefied propane gas (LPG), atmospheric or vacuum distillates, heavy oil streams such as the residuum obtained after atmospheric and/or vacuum distillation of crude oil, mercaptan-containing off-gas from a mercaptan absorber. A particularly suitable hydrocarbonaceous compound-comprising feedstock is natural gas.

Preferably, the feedstock also comprises hydrogen sulphide. In case the feedstock comprises hydrogen sulphide, part or all of the elemental sulphur needed for the reaction of the hydrocarbonaceous compound with elemental sulphur according to equation (1) may be produced in the reaction zone by selective oxidation of the externally supplied hydrogen sulphide according to reaction equation (2). If sufficient hydrogen sulphide is supplied to the reaction zone with the feedstock, the process may be carried out without net consumption of elemental sulphur.

The molecular-oxygen containing gas that is supplied to the reaction zone preferably is pure oxygen, air or oxygen-enriched air. The molecular-oxygen containing gas and the feedstock may be supplied separately to the reaction zone or as a mixture. A staged supply of molecular-containing gas to the reaction zone may be applied, in order to avoid the occurrence of hot spots as a result of local excess of oxygen.

In order to minimise oxidation of the hydrocarbonaceous compound to carbon oxides as well as oxidation of carbon disulphide to carbon dioxide and sulphur dioxide, molecular oxygen is preferably supplied to the reaction zone in a sub-stoichiometrical amount, i.e. the number of oxygen molecules supplied to the reaction zone is less than 25% of the number of the hydrogen atoms in the hydrocarbonaceous and hydrogen sulphide supplied to the reaction zone. Preferably, the amount of oxygen molecules supplied to the reaction zone is not less than 5% of the stoichiometric amount, more preferably not less than 10% of the stoichiometric amount, even more preferably not less than 30%.

In the process according to the invention, both the feedstock and the molecular-oxygen containing gas will typically be continually supplied to the reaction zone. If the feedstock is gaseous, the feedstock may be supplied to the reaction zone separately or together with the molecular-oxygen containing gas. In case the hydrocarbonaceous compound is solid at the reaction conditions applied, the feedstock is preferably supplied to the reaction zone by pre-mixing it with the liquid sulphur phase with which the reaction zone is to be filled. This may also be done in case of a hydrocarbonaceous compound that is liquid at the reaction conditions applied. Preferably, a liquid feedstock is continually supplied to the reaction zone, either co-currently or countercurrently with the molecular-oxygen containing gas supplied to the reaction zone.

The process may be carried out in any reactor configuration suitable for gas-liquid contacting, typically by bubbling the gaseous reactants through a reactor filled with liquid sulphur. In order to prevent the formation of gas slugs, the reactor may contain solid contactors, for example a structured packing or gauzes.

In case there is net consumption of elemental sulphur, a stream of liquid make-up sulphur may be continuously supplied to the reaction zone. Alternatively, the elemental sulphur in the reaction zone is periodically refreshed.

In case the hydrocarbonaceous compound is gaseous at the reaction conditions applied, the initial contact time of the hydrocarbonaceous compound with the liquid sulphur is preferably in the range of from 0.1 to 200 seconds. It will be appreciated that the optimal contact time will increase with the refractive nature of the hydrocarbonaceous compound. A hydrocarbonaceous compound that is solid at the reaction conditions applied will therefore generally require a longer contact time than a compound that is liquid at the reaction conditions applied and a liquid compound will generally require a longer contact time than a gaseous compound.

The process according to the invention is carried out at a temperature in the range of from 300 to 750° C., preferably of from 400 to 700° C., more preferably of from 400 to 650° C.

The reactants are reacted with each other at a pressure that is sufficient to maintain a liquid elemental sulphur phase. Therefore, the pressure strongly depends on the reaction temperature. Preferably, the pressure is in the range of from 3 to 200 bar (absolute), more preferably of from 5 to 100 bar (absolute), even more preferably of from 5 to 30 bar (absolute).

It is an advantage of the process according to the invention that no catalyst is needed. Preferably, the hydrocarbonaceous compound is reacted with the sulphur in the absence of a catalyst.

It is an advantage of the process according to the invention that, under the reaction conditions applied, the molecular oxygen selectively reacts with hydrogen sulphide, i.e. without oxidising substantial amounts of hydrocarbonaceous compound or carbon disulphide.

In the process according to the invention, a gaseous phase mainly comprising carbon disulphide and steam is formed. In the preferred embodiment that a sub-stoichiometric amount of molecular oxygen is used, the gaseous phase also comprises hydrogen sulphide. Typically, the gaseous phase will also comprise small amounts of carbonyl sulphide, carbon dioxide, sulphur dioxide, and elemental sulphur. In case a gaseous hydrocarbonaceous compound is used, the gaseous phase typically also comprises unconverted hydrocarbonaceous compound.

Preferably, the process according to the invention further comprises withdrawing the gaseous phase comprising carbon disulphide and steam from the reaction zone and condensing at least part of the gaseous phase to obtain a liquid stream comprising carbon disulphide.

If the effluent of the reaction zone is a mixed liquid and gaseous effluent, such as may for example be the case if a liquid feedstock is co-currently with the molecular-oxygen containing gas supplied to the reaction zone, the gas and the liquid phases of the effluent will first be separated in a gas-liquid separator.

The withdrawn gaseous phase may be condensed to obtain a liquid stream comprising carbon disulphide. Preferably, the gaseous phase is subjected to sequential partial condensation steps to obtain a liquid stream with a higher concentration of carbon disulphide. Purification steps other than condensation may also be applied in order to obtain a liquid stream comprising carbon disulphide with the desired composition.

Preferably, the gaseous phase withdrawn from the reaction zone is first cooled at super-atmospheric pressure to a temperature at which elemental sulphur condenses whilst carbon disulphide and the other components remain in the sulphur-depleted vapour phase. The condensed sulphur may then be recycled to the reaction zone. The sulphur-depleted vapour phase may be condensed to obtain the liquid stream comprising carbon disulphide. Preferably, water is selectively condensed from the sulphur-depleted vapour phase to obtain a steam-depleted vapour phase. The steam-depleted vapour phase is then condensed to obtain the liquid phase comprising carbon disulphide.

It will be appreciated that the desired composition of the liquid stream comprising carbon disulphide will determine the condensation and/or purification steps needed. For the conventional applications of carbon disulphide, for example its use as raw material for rayon production or as solvent, a high purity of carbon disulphide is desired. If the liquid stream is used for enhanced oil recovery, i.e. for injecting it in an oil reservoir for increasing the oil production from that reservoir, the liquid carbon disulphide stream may comprise substantial amounts of other components such as hydrogen sulphide, carbonyl sulphide, carbon oxides, sulphur oxides, hydrocarbonaceous compounds and water.

The liquid stream comprising carbon disulphide that is formed in the process according to the invention is particularly suitable to be used in enhanced oil recovery, since the liquid stream typically comprises components other than carbon disulphide that do not need to be removed for this application. Therefore, the process according to the invention preferably further comprises injecting the liquid stream comprising carbon disulphide into an oil reservoir for enhanced oil recovery. The liquid stream comprising carbon disulphide may be mixed with other liquid components or streams before being injected into the oil reservoir.

Typically, the liquid stream comprising carbon disulphide obtainable by the process according to the invention will also comprise hydrogen sulphide and carbonyl sulphide dissolved in the carbon disulphide. Typical concentrations are in the range of from 0.05 to 50 wt % hydrogen sulphide and 0.01 to 15 wt % carbonyl sulphide based on the amount of carbon disulphide. The invention therefore further provides the use of a liquid stream comprising carbon disulphide, hydrogen sulphide and carbonyl sulphide obtainable by the process according to the invention for enhanced oil recovery.

The process according to the invention will be further illustrated by means of the following non-limiting examples.

EXAMPLE 1

In a quartz reactor tube (inner diameter 12 mm; length 40 mm) an amount of powdered elemental sulphur is loaded. The reactor is brought at a pressure of 10 bar (absolute) with a flow of nitrogen and the reactor is heated to a reaction temperature above 400° C. At the reaction temperature, the reactor tube was filled with a liquid sulphur column with a height of 15 cm (equivalent to $1.7 \cdot 10^{-2}$ liters sulphur). A gaseous mixture comprising a hydrocarbon (methane or ethane) and oxygen was supplied to the bottom of the reactor. At the top of the reactor, a gaseous effluent was withdrawn. The composition of the gaseous effluent was analysed by gas chromatography. Six different experiments were carried out. In the comparative experiments 1 and 4, no oxygen was supplied to the reactor. Experiments 2, 3, 5, and 6 are experiments according to the invention.

In Table 1, the reaction conditions and the results are given for experiments 1 to 6.

In the laboratory-scale reactor equipment used in this example, there was no possibility for staged supply of oxygen to the reactor. Therefore, the amount of oxygen supplied to the reactor was kept low in order to minimise oxidation of hydrocarbon and carbon disulphide near the reactor inlet. If the experiments were carried out in a reactor with the possibility to supply oxygen at different stages in the reactor, a larger amount of oxygen, but still a sub-stoichiometric amount, would have been supplied.

EXAMPLE 2

Three different experiments (experiments 7 to 9) were carried out as described in EXAMPLE 1. In experiments 7 to 9, the feed gas mixtures supplied to the reactor tube comprised hydrogen sulphide. The reaction conditions and the results were as shown in Table 2.

TABLE 1

Reaction conditions and results for experiments 1 to 6.

| experiment | $hc^a$ | feed composition $hc^a/O_2/H_2S/He/N_2$ (% volume) | T (° C.) | flow rate[b] (Nl/hr) | $hc^a$ conversion (% mole) | yield (% mole/mole) | | | | |
|---|---|---|---|---|---|---|---|---|---|---|
| | | | | | | $CS_2$ | $H_2S$ | COS | $SO_2$ | $CO_2$ |
| 1 | methane | 18.8/—/—/—/81.1 | 486 | 2.6 | 20.4 | 21.0 | 43.9 | | | |
| 2 | methane | 14.3/4.1/1.1/46.8/33.7 | 488 | 3.2 | 25.8 | 16.7 | 1.3 | 7.9 | 2.1 | 0.9 |
| 3 | methane | 15.4/4.1/—/46.8/33.7 | 490 | 3.2 | 29.0 | 16.5 | 16.5 | 11 | 0 | 1.4 |
| 4 | ethane | 12.9/—/—/—/— | 420 | 2.4 | 13.0 | 26.4 | 35.3 | | | |

TABLE 1-continued

Reaction conditions and results for experiments 1 to 6.

| experiment | hc[a] | feed composition hc[a]/$O_2$/$H_2S$/He/$N_2$ (% volume) | T (°C.) | flow rate[b] (Nl/hr) | hc[a] conversion (% mole) | yield (% mole/mole) | | | | |
|---|---|---|---|---|---|---|---|---|---|---|
| | | | | | | $CS_2$ | $H_2S$ | COS | $SO_2$ | $CO_2$ |
| 5 | ethane | 9.6/2.1/—/23.8/64.5 | 424 | 3.2 | 9.0 | 17.6 | 5.9 | 0.4 | 11.1 | 0.1 |
| 6 | ethane | 9.6/2.1/—/23.8/64.5 | 462 | 3.2 | 21.0 | 40.4 | 22.8 | 1.1 | 0.5 | 0.3 |

[a]hc: hydrocarbon.
[b]normal liters (liters at STP conditions, i.e. 0° C. and 1 atm.) feed gas mixture per hour.

TABLE 2

Reaction conditions and results for experiments 7 to 9.

| experiment | feed composition $CH_4$/$O_2$/$H_2S$/He/$N_2$ (% volume) | T (°C.) | flow rate[b] (Nl/hr) | $CH_4$ conversion (% mole) | yield (% mole/mole) | | | | |
|---|---|---|---|---|---|---|---|---|---|
| | | | | | $CS_2$ | $H_2S$ | COS | $SO_2$ | $CO_2$ |
| 7 | 29.5/3.2/5.2/36.9/25.2 | 435 | 4.0 | 5.7 | 5.5 | −7.3 | 0.2 | 0.07 | <0.01 |
| 8 | 25.1/3.9/4.4/45.1/21.5 | 436 | 4.7 | 5.3 | 5.0 | −12.2 | 0.4 | 1.8 | <0.01 |
| 9 | 29.5/3.2/5.2/36.9/25.2 | 422 | 4.0 | 3.5 | 3.1 | −11.6 | 0.2 | 0.09 | <0.01 |

[b]normal liters (liters at STP conditions) feed gas mixture per hour.

That which is claimed is:

1. A process for the manufacture of carbon disulphide comprising supplying a molecular oxygen-containing gas and a feedstock comprising a hydrocarbonaceous compound to a reaction zone containing a liquid elemental sulphur phase and reacting, in the liquid sulphur phase, at a temperature in the range of from 300 to 750° C., the hydrocarbonaceous compound with the liquid elemental sulphur in the absence of a catalyst to form carbon disulphide and hydrogen sulphide and oxidising at least part of the hydrogen sulphide formed to elemental sulphur and water in the reaction zone.

2. A process according to claim 1, wherein the feedstock comprises hydrogen sulphide.

3. A process according to claim 1, wherein the hydrocarbonaceous compound is a compound that is gaseous at the reaction conditions.

4. A process according to claim 1, wherein the number of oxygen molecules supplied to the reaction zone is less than 25% of the number of the hydrogen atoms in the hydrocarbonaceous compound and the hydrogen sulphide supplied to the reaction zone.

5. A process according to claim 1, wherein the temperature in the reaction zone is in the range of from 400 to 700° C.

6. A process according to claim 1, wherein the pressure in the reaction zone is in the range of from 3 to 200 bar (absolute).

7. A process according to claim 1, further comprising withdrawing a gaseous phase comprising carbon disulphide and steam from the reaction zone, condensing at least part of the gaseous phase to obtain a liquid stream comprising carbon disulphide.

8. A process according to claim 1, wherein the hydrocarbonaceous compound is a saturated or unsaturated aliphatic hydrocarbon.

9. A process according to claim 1, wherein the hydrocarbonaceous compound is an aliphatic hydrocarbon with up to 20 carbon atoms.

10. A process according to claim 1, wherein the hydrocarbonaceous compound is a saturated aliphatic hydrocarbon with up to 4 carbon atoms.

11. A process according to claim 1, wherein the temperature in the reaction zone is in the range of from 400 to 650° C.

12. A process according to claim 1, wherein the pressure in the reaction zone is in the range of from 5 to 100 bar (absolute).

13. A process according to claim 1, wherein the pressure in the reaction zone is in the range of from 5 to 30 bar (absolute).

14. A process according to claim 1, further comprising injecting a liquid stream comprising carbon disulphide into an oil reservoir for enhanced oil recovery.

15. A process according to claim 2, wherein the hydrocarbonaceous compound is a compound that is gaseous at the reaction conditions.

* * * * *